(12) United States Patent
Wason

(10) Patent No.: US 9,381,622 B2
(45) Date of Patent: Jul. 5, 2016

(54) CUTTING TOOL WITH ACTUATED BLADE GUIDE

(75) Inventor: Peter M. Wason, Manchester, NH (US)

(73) Assignee: Hubbell Incorporated, Shelton, CT (US)

( * ) Notice: Subject to any disclaimer, the term of this patent is extended or adjusted under 35 U.S.C. 154(b) by 727 days.

(21) Appl. No.: 13/554,028

(22) Filed: Jul. 20, 2012

(65) Prior Publication Data

US 2014/0020528 A1    Jan. 23, 2014

(51) Int. Cl.
*B25B 7/02*  (2006.01)
*H02G 1/00*  (2006.01)
*B25B 27/10*  (2006.01)

(52) U.S. Cl.
CPC *B25B 7/02* (2013.01); *H02G 1/005* (2013.01); *B25B 27/10* (2013.01); *Y10T 83/04* (2015.04); *Y10T 83/8878* (2015.04)

(58) Field of Classification Search
CPC .... B26B 17/00; B26B 17/003; B26B 17/006; B25B 7/04; B25B 7/02; B25B 7/22; B25B 27/10; H02G 1/005; Y10T 83/8878; Y10T 83/04
USPC ............... 83/465, 457, 456; 30/96, 92.5, 179, 30/193, 233, 132, 131, 92, 1, 91.2, 494, 30/109, 112, 120.3
See application file for complete search history.

(56) References Cited

U.S. PATENT DOCUMENTS

| 773,743 A | 11/1904 | Von Hoffman | |
| 1,626,274 A * | 4/1927 | Duffy | 30/90.2 |
| 1,876,218 A | 9/1932 | Gee | |
| 2,556,559 A | 6/1951 | Smith | |
| 3,340,611 A * | 9/1967 | Lauck | 30/124 |
| 3,628,247 A | 12/1971 | Lattin et al. | |
| 4,026,028 A | 5/1977 | Green | |
| 4,235,016 A | 11/1980 | Kobelt | |
| 4,677,748 A | 7/1987 | Kobayashi | |
| 5,237,899 A * | 8/1993 | Schartinger | 83/454 |
| 5,429,158 A | 7/1995 | Kurmis | |
| 5,653,027 A | 8/1997 | Wall | |
| 6,581,262 B1 * | 6/2003 | Myers | 29/268 |
| 2004/0045173 A1 * | 3/2004 | Ebert | 30/188 |
| 2005/0262697 A1 | 12/2005 | Stein | |
| 2015/0089816 A1 * | 4/2015 | Chiasson et al. | 30/233 |

OTHER PUBLICATIONS

Catalog Page: 25CAT Cutter Head Attachment, Huskie Tools, Inc., 2011.

* cited by examiner

*Primary Examiner* — Sean Michalski
*Assistant Examiner* — Jonathan Riley
(74) *Attorney, Agent, or Firm* — Dickinson Wright PLLC

(57) ABSTRACT

A cutting tool with first and second pivoted shearing blades has a guide member mounted to the first blade for transverse movement relative to the first blade and toward and away from the second blade. The guide member has at least one transverse restraining surface that confronts a transverse guided surface of at least one of the distal blade portions during cutting to resist axial separation of the cutting edges away from the cutting plane. In some embodiments, the guide member is actuated by placing the workpiece between the blades. Alternatively, the guide member is actuated by relative pivotal movement of the blades.

45 Claims, 7 Drawing Sheets

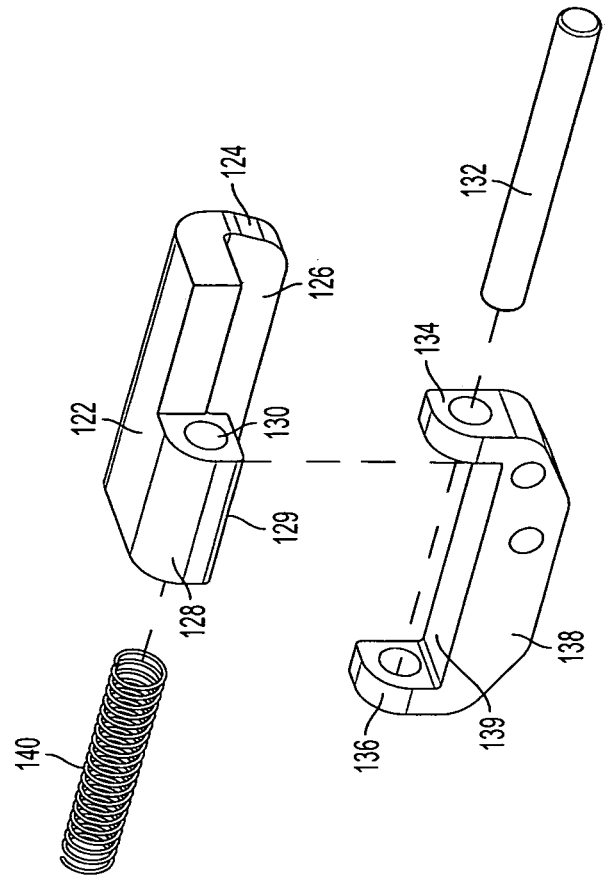
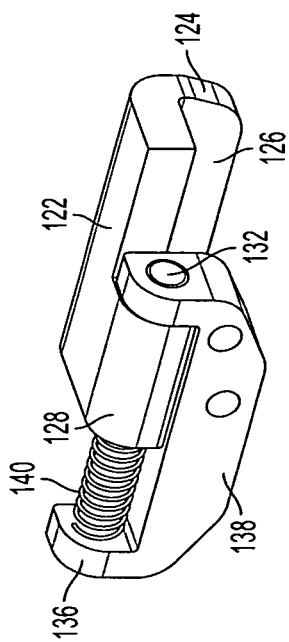
FIG. 5
FIG. 4

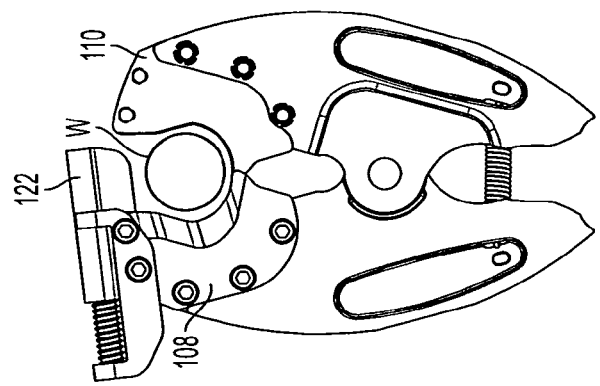
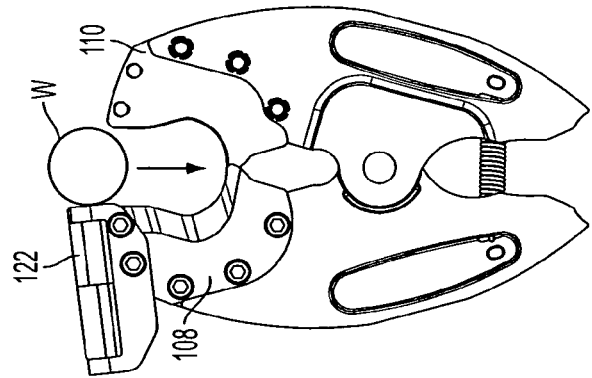
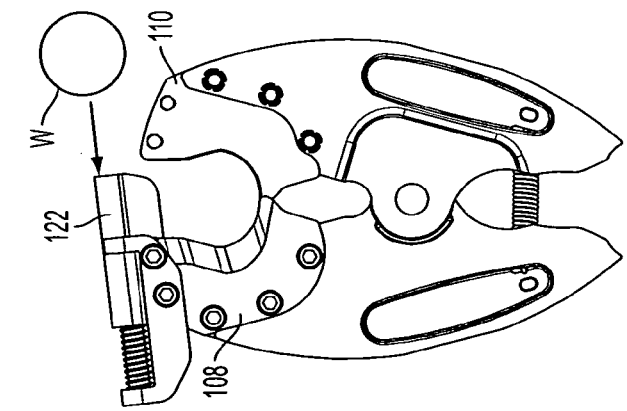
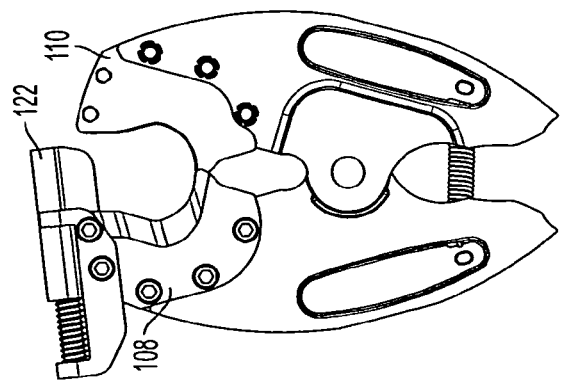

CUTTING TOOL WITH ACTUATED BLADE GUIDE

FIELD OF THE INVENTION

The invention relates to cutting tools, in particular, to scissor-action tools having pivoted shearing blades for cutting cables and similar workpieces.

BACKGROUND OF THE INVENTION

Scissor-action tools for cutting cables and similar workpieces have cutting blades that typically are guided when cutting so they do not bend away from each other and from the cutting plane they define. The shearing blade tips must be able to open wide enough to allow a cable to enter through the front of the tool (thus enabling lateral cable engagement) and then travel through the cable until it is severed. Ideally, the blades should travel from fully open to the "guided" position before cutting begins, but that objective is not easily achieved, especially when cutting larger diameter cables.

SUMMARY OF THE INVENTION

The invention broadly encompasses a cutting tool comprising first and second shearing blades and an actuated guide mechanism that resists axial separation of the blades during cutting. The first and second blades are mounted for relative pivotal movement about a pivot axis and have respective cutting edges defining therebetween a transverse cutting plane substantially normal to the pivot axis. The first and second blades have respective first and second distal blade portions that converge transversely as the blades relatively advance from an open position to engage a workpiece disposed between the blades. A guide mechanism includes a guide member mounted to the first blade for transverse movement relative to the first distal blade portion and toward and away from the second distal blade portion. The guide member has at least one transverse restraining surface that confronts a transverse guided surface of at least one of the distal blade portions during cutting to resist axial separation of the cutting edges away from the cutting plane.

In several embodiments, the guide mechanism is responsive to placement of a workpiece in the space between the blades, when open, to cause the guide member to move toward the second distal blade portion. In one such embodiment, the guide member is biased toward the second distal blade portion, spanning at least a portion of the gap between the distal blade portions when open; and the guide member is deflected away from the second distal blade portion to open the gap by urging the guide member against the workpiece. In other workpiece-responsive embodiments, the guide member is biased away from the second distal blade portion and is caused to move toward that distal blade portion when the workpiece contacts and deflects an activation portion of the mechanism that projects into the space between the blades.

In yet another embodiment, the guide member is biased away from the second distal blade portion and is caused to move toward that distal blade portion by initial closing movement of the blades through movement of a guide mechanism portion that engages the second blade.

The invention also broadly encompasses a method for cutting a workpiece, as follows. The workpiece is placed between first and second shearing blades mounted for relative pivotal movement about a pivot axis and having respective cutting edges defining therebetween a transverse cutting plane substantially normal to the pivot axis. The first and second blades have respective first and second distal blade portions that converge transversely as the blades relatively advance from an open position to engage the workpiece. The first blade supports a guide member movable transversely relative to the first distal blade portion and toward and away from the second distal blade portion. The guide member has at least one transverse restraining surface that confronts a transverse guided surface of at least one of the distal blade portions during cutting to resist axial separation of the cutting edges away from the cutting plane. The guide member is moved transversely toward the second distal blade portion; and the blades are moved relative to one another to advance them toward and then through the workpiece.

In practicing the method, the step of moving the guide member toward the second distal blade portion may be effected by performing the step of placing the workpiece between the blades. Alternatively, the step of moving the guide member toward the second distal blade portion may be effected by performing the step of moving the blades relative to one another. In another arrangement, the step of placing a workpiece between the blades comprises first moving the guide member away from the second distal blade portion, and the step of moving the guide member toward the second distal blade portion comprises returning the guide member to its initial position.

BRIEF DESCRIPTION OF THE DRAWING

Several embodiments of the disclosed invention, including the best mode for carrying out the invention, are described in detail below purely as examples, with reference to the accompanying drawing, in which:

FIG. 4 is a perspective view of the guide mechanism thereof;

FIG. 5 is an exploded view of the guide mechanism of FIG. 4;

FIGS. 6a-6d are a front elevational views of the cutting tool of FIG. 1 shown in sequential stages of use;

DETAILED DESCRIPTION OF THE INVENTION

Figure 3:
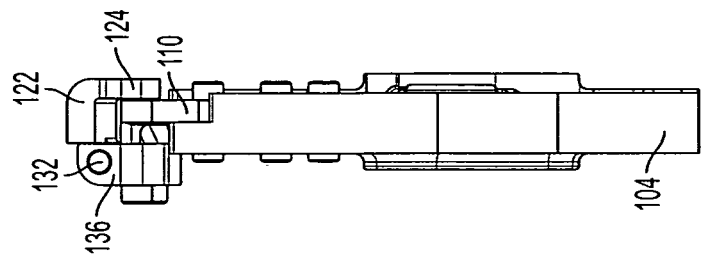
FIG. 3 is a right side elevational view thereof.

Each of the five disclosed embodiments of the invention is shown in the drawing figures as a cutting head per se having a pair of pivoted jaws, each jaw supporting a replaceable shearing blade having a cutting edge. The jaw and blade components are identical in all embodiments, so like reference numbers in different series (100, 200, etc.) are used to identify them. The cutting head is adapted to be mounted to a manual or a powered actuator that supplies a force to cause relative pivotal movement of the jaws and, hence, the shearing blades, in a manner well known in this art. As used throughout this application, including the claims, the terms "first blade," "second blade" and "blade" are intended to cover the blades per se as well as their supporting structures, such as their jaws, unless otherwise indicated or implied.

Referring to FIGS. 1-6, a first embodiment 100 of a cutting tool according to the invention comprises a first jaw 102 pivoted to a second jaw 104 for relative movement about a pivot axis 106. The cutting end of the tool comprises a first shearing blade 108 bolted to first jaw 102 and a second shearing blade 110 bolted to second jaw 104. Blade 108 has a cutting edge 112, blade 110 has a cutting edge 114, and the two cutting edges 112, 114 define between them a transverse cutting plane substantially normal to pivot axis 106. The powered end of the tool comprises inner surfaces 116, 118 on jaws 102, 104 that are spread apart by an advancing actuator member (not shown) in a manner known in the art, which causes blades 108, 110 to converge and cut through a workpiece W (e.g., cable) placed between them. A helical tension spring 120 extending between the jaws at the powered end of the tool biases the blades to the open position, shown in FIG. 2, also in a manner known in the art.

The blade guide mechanism of the first embodiment includes a guide member in the form of an L-shaped arm 122 having a transversely extending flange 124, the inner surface 126 of which confronts the outer surface of blade 110 during cutting. Arm 122 also has a laterally projecting boss 128 with a bore 130 surrounding and slideable along a transversely extending rail (pin) 132, which keeps arm 122 and its flange 124 parallel to the cutting plane. Rail 132 is supported between the front ear 134 and the rear ear 136 of a bracket 138, which is bolted to the distal portion of blade 108. A coil spring 140 surrounds rail 132 between boss 128 and rear ear 136 to bias arm 122 forward toward the distal portion of blade 110. The lower surface 129 of boss 128 lies close to the upper surface 139 of bracket 138, thus preventing arm 122 from rotating about rail 132.

Figure 2:
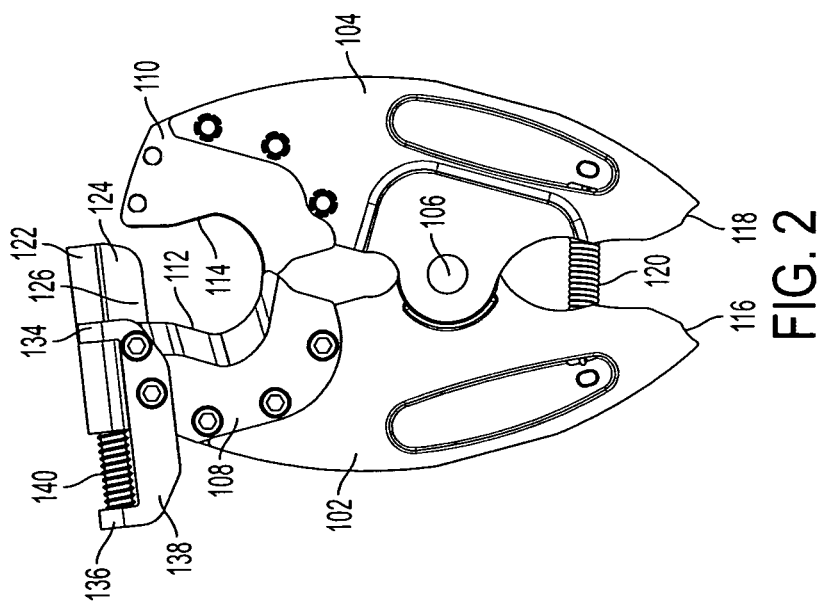
FIG. 2 is a front elevational view thereof.
Figure 1:
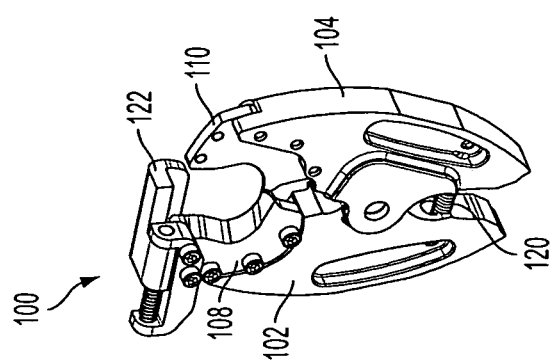
FIG. 1 is a perspective view of a first embodiment of a cutting tool according to the invention.

As seen in FIGS. 2 and 6a, which show the blades in their fully open state with arm 122 fully extended, arm 122 extends farther from pivot axis 106 than opposing blade 110 so as to facilitate the arm's engagement with a workpiece W (see FIG. 6b). In this state, arm 122 spans a substantial portion (e.g., at least half) of the gap defined by the distal portions of blades 108, 110. Preferably, arm 122 spans about 80% of the gap, as shown, so that the arm begins to perform its blade-guiding function very soon after the blade tips begin to converge. In its retracted state with the blades open (see FIG. 6c), arm 122 opens the gap sufficiently to allow entry of the largest diameter workpiece specified for cutting. Arm 122 is retracted by urging its free end against a workpiece W (see FIG. 6b); and once the arm retracts sufficiently to allow the workpiece to pass between the distal blade portions (see FIG. 6c) the tool is simply pushed onto the workpiece, whereupon spring 140 returns the arm to its initial, fully extended position (see FIG. 6d). As the cutting operation commences, inner guide surface 126 promptly confronts the outer surface of blade 110 to resist deflection of the blades away from the cutting plane.

Figure 8:
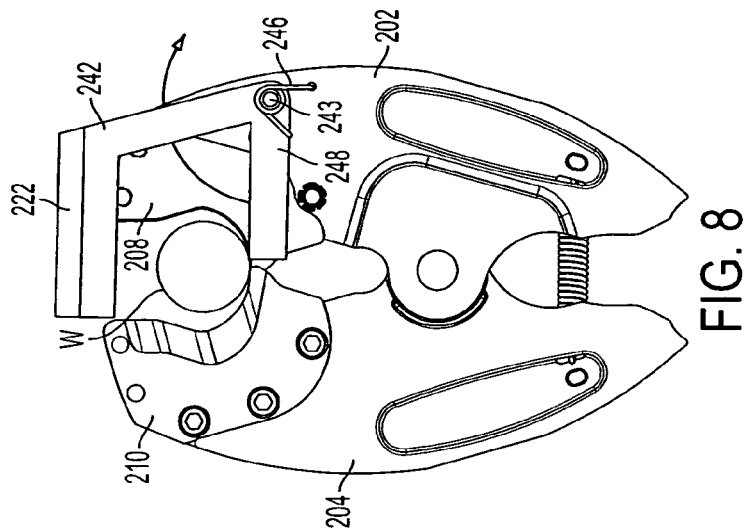
FIG. 8 is a front elevational view thereof shown in a subsequent stage of use.
Figure 9:
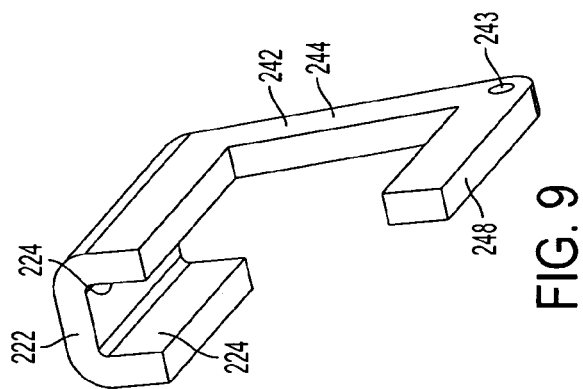
FIG. 9 is a perspective view of the guide mechanism thereof.
Figure 7:
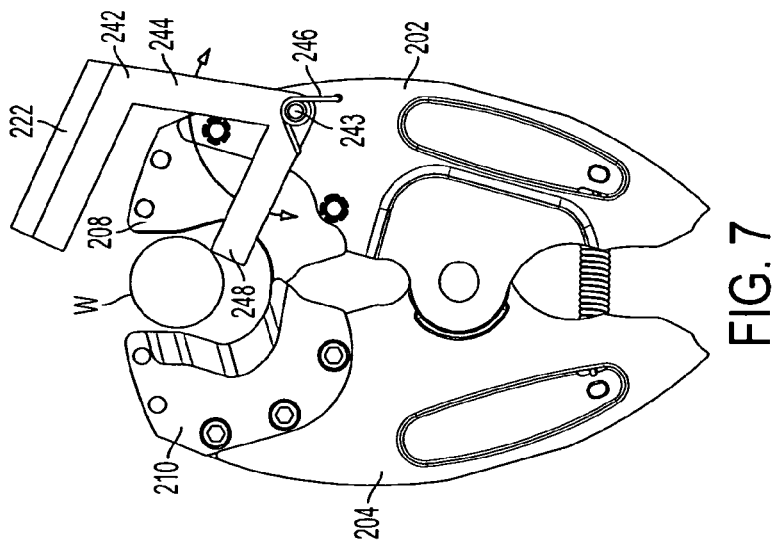
FIG. 7 is a front elevational view of a second embodiment of a cutting tool according to the invention shown in an initial stage of use.

FIGS. 7-9 show a second embodiment of the invention in which the guide member 222, carried by the first blade 208, is biased away from the opposing (second) blade 210, rather than toward it as in the first embodiment. Guide member 222 is in the form of an inverted trough (see FIG. 9) rigidly carried at the end of one leg 244 of an L-shaped arm 242, which is pivoted at its elbow 243 to the first blade 208 (actually to its jaw 202). Guide member 222 is biased away from second blade 210 by a torsion spring 246 anchored to jaw 202 and hooked to the lower leg 248 of arm 242. Any other suitable biasing arrangement may be used. Lower leg 248 extends into the space between the blades, when open, and acts as an actuating lever that is deflected by the workpiece W when it enters that space, pivoting arm 242 and guide member 222 toward second blade 210 (see FIG. 8). At this point guide member 222 substantially closes the gap between the blades so that when the cutting operation begins, its inner transverse surfaces 224 confront the outer surfaces of the blades to resist deflection of the blades away from the cutting plane. When cutting is complete, the workpiece falls away and spring 246 returns guide member 222 to its initial position (FIG. 7).

Figure 11:
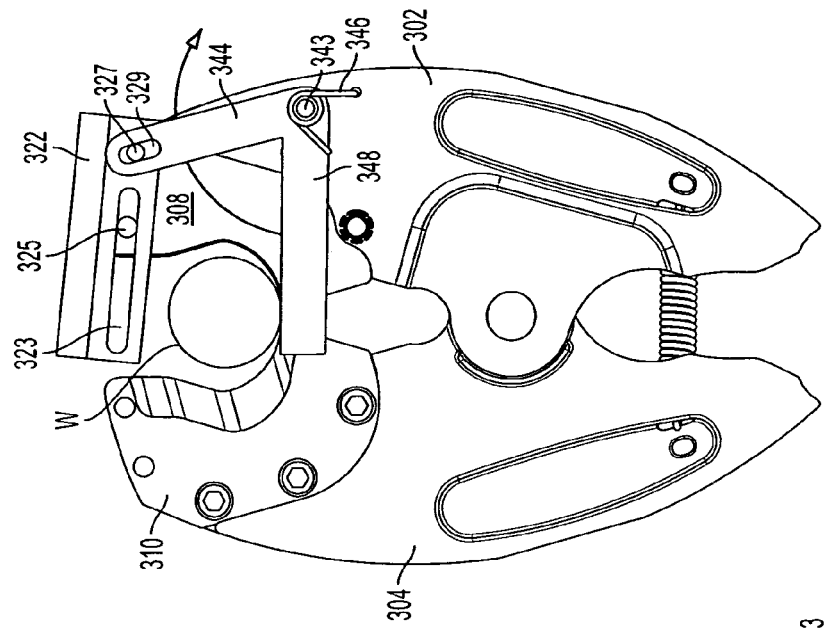
FIG. 11 is a front elevational view thereof shown in a subsequent stage of use.
Figure 12:
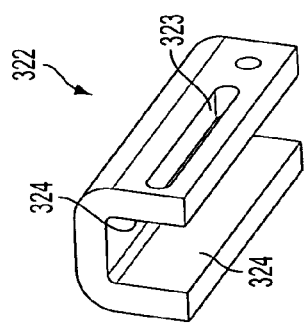
FIG. 12 is a perspective view of a portion of the guide mechanism thereof.
Figure 10:
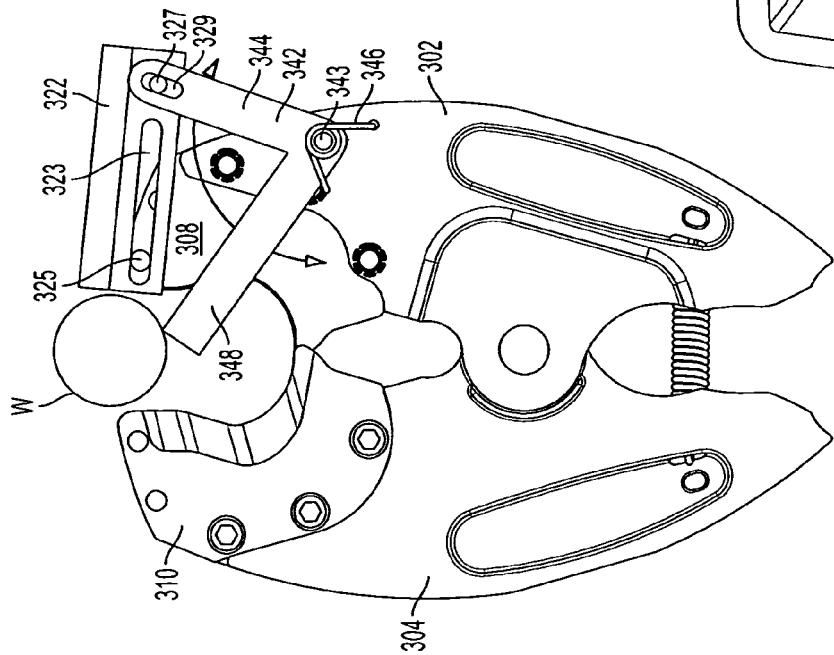
FIG. 10 is a front elevational view of a third embodiment of a cutting tool according to the invention shown in an initial stage of use.

FIGS. 10-12 show a third embodiment of the invention in which the guide member 322, carried by the first blade 308, also is biased away from the opposing (second) blade 310 by a torsion spring 346, which similarly is hooked to lower leg 348 of an L-shaped arm 342 pivoted at its elbow 343 to first blade 308 (actually to its jaw 302). Lower actuating leg 348 similarly extends into the space between the blades, when open. Guide member 322 also is trough-shaped (see FIG. 12), but it has a slot 323 on one side slideably guided by a pin 325 protruding from the inner face of blade 308. The proximal end of guide member 322 has a protruding pin 327 that slideably engages a slot 329 at the outer end of leg 344 of arm 342. The operation of this embodiment is similar to the second one, except that the slot-and-pin arrangement constrains movement of guide member 322 to keep it close to the tips of the blades throughout its cycle.

Figure 14:
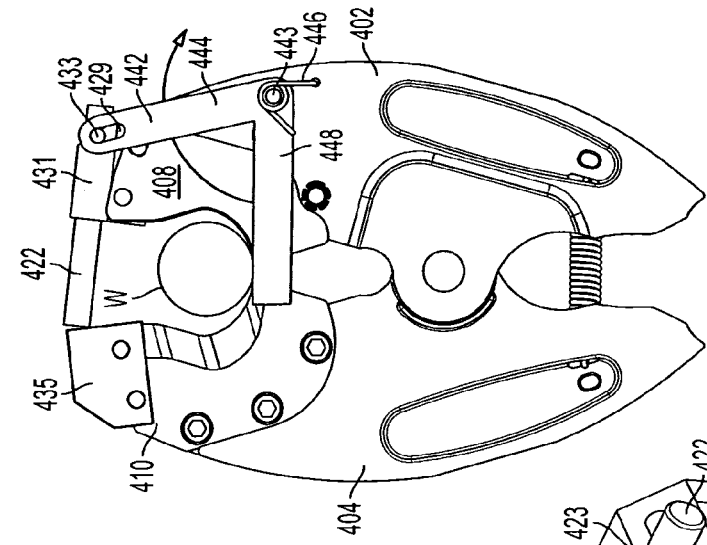
FIG. 14 is a front elevational view thereof shown in a subsequent stage of use.
Figure 15:
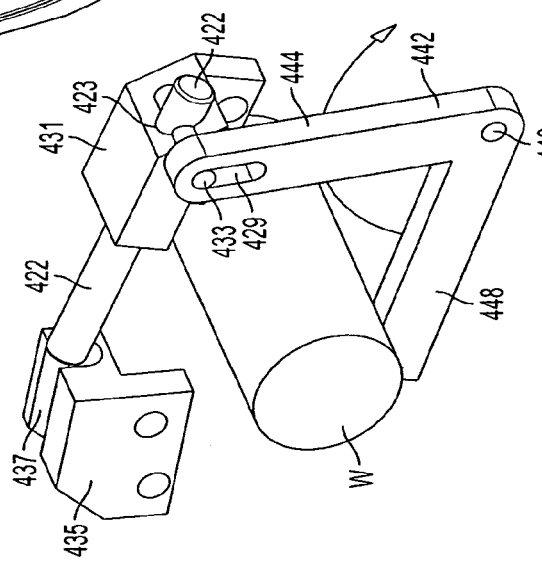
FIG. 15 is a perspective view of the guide mechanism thereof.
Figure 13:
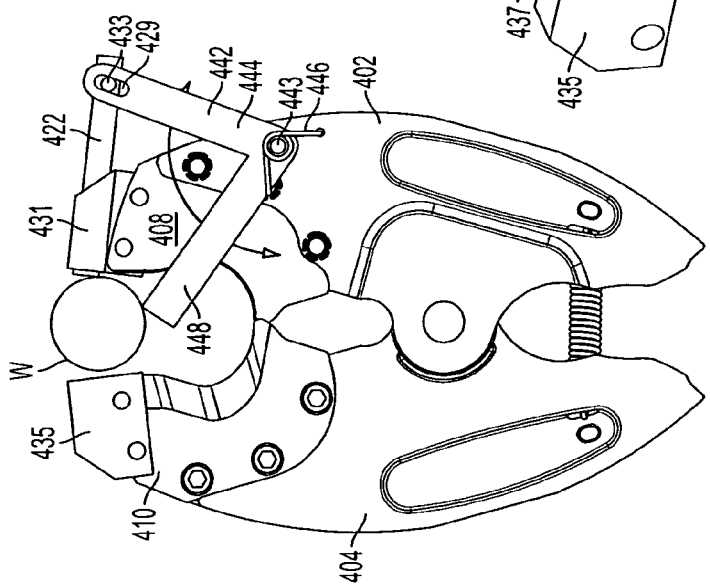
FIG. 13 is a front elevational view of a fourth embodiment of a cutting tool according to the invention shown in an initial stage of use.

FIGS. 13-15 show a fourth embodiment of the invention similar to the third embodiment in that a guide member 422, carried by the first blade 408, is biased away from the opposing (second) blade 410 by a torsion spring 446 hooked to an L-shaped arm 442, which is pivoted at its elbow 443 to first blade 408 (actually to its jaw 402); and in that it has a similar lower actuating leg 448 that extends into the space between the blades, when open. In this case, however, guide member 422 is in the form of a transversely extending round pin that moves linearly in a bore 423 of a bracket 431 bolted to the distal portion of first blade 408. A linking pin 433 connects the rear end of guide member 422 to a slot 429 at the outer end of leg 444 of arm 442. Second blade 410 has its own bracket 435 bolted thereto, which has an outwardly opening groove 437 (see FIG. 15) that closely receives guide member 422 as the distal portions of the blades converge. In this embodiment, the guided surface of the first blade 408 is an inside surface of bore 423 in bracket 431; the guided surface of the second blade 410 is an inside surface of the groove 437 in bracket 435; and the restraining surfaces are portions of the surface of pin-like guide member 422.

Figure 17:
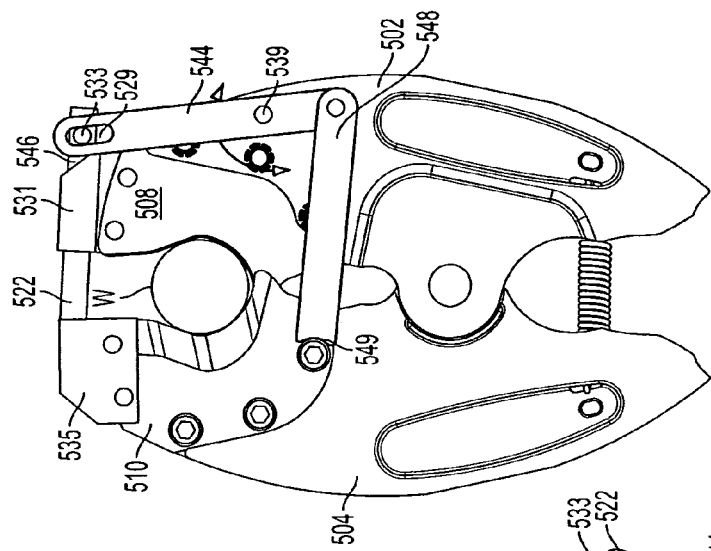
FIG. 17 is a front elevational view thereof shown in a subsequent stage of use.
Figure 18:
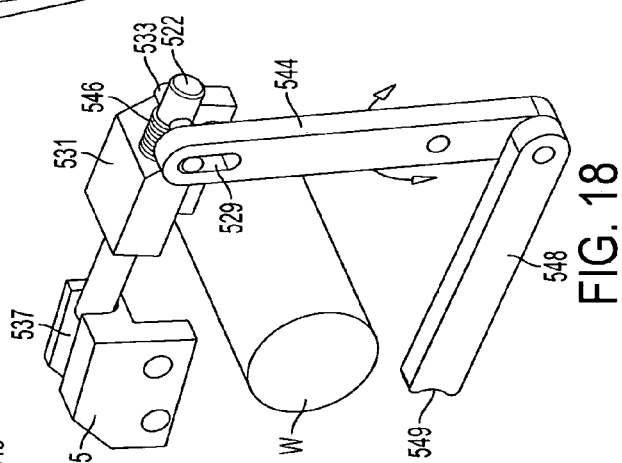
FIG. 18 is a perspective view of the guide mechanism thereof.
Figure 16:
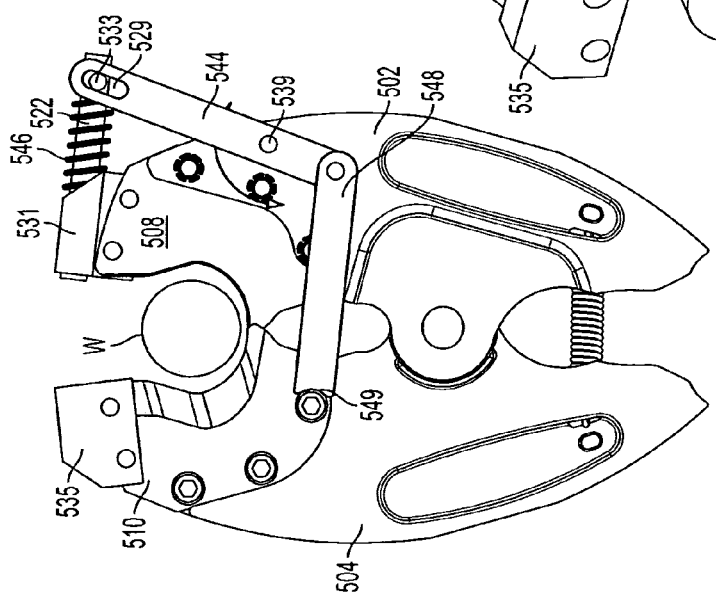
FIG. 16 is a front elevational view of a fifth embodiment of a cutting tool according to the invention shown in an initial stage of use.

FIGS. 16-18 show a fifth embodiment of the invention similar to the fourth embodiment in that it has the same guiding and restraining arrangement, viz., a pin-like guide member 522 slideable in a bracket 531 on first blade 508 and engageable in a groove 537 in a bracket 535 on second blade 510. In this embodiment, however, relative pivotal movement of the blades actuates the guide member, rather than placement of a workpiece between the blades. A slotted (529) intermediate link 544 is pinned at 533 to guide member 522 and is pivoted intermediate its length at 539 to the first blade 508 (actually to its jaw 502). One end of an actuating link 548 is pivoted to the lower end of slotted link 544, while the other end 549 of link 548 engages the head of a blade-mounting bolt. As illustrated, end 549 of link 548 simply cradles the bolt head, but it could be more firmly secured pivotally to the blade structure by other means. A helical compression spring 546 surrounds guide member 522 between bracket 531 and link 544 and biases the guide member 522 away from the second blade 510.

While several embodiments have been chosen to illustrate the cutting tool of the invention, it will be understood by those skilled in the art that various changes and modifications may be made without departing from the scope of the invention as defined by the appended claims. From a practical standpoint, embodiments of the invention preferably should be configured such that the guide member moves into its guiding position (i.e., to guide both blades) at a fairly early stage so that the blades are guided throughout most of the cutting process. More preferable are embodiments configured such that the guide member moves into its guiding position before cutting of the workpiece begins.

What is claimed is:

1. A cutting tool, comprising:
   first and second shearing blades mounted for relative pivotal movement about a pivot axis and having respective cutting edges defining therebetween a transverse cutting plane substantially normal to said pivot axis, said first and second blades having respective first and second distal blade portions that converge transversely as the blades relatively advance from an open position to engage a workpiece disposed between the blades; and
   a guide mechanism including a guide member mounted to the first blade for transverse movement relative to the first distal blade portion and toward and away from the second distal blade portion, said guide member having at least an inner surface of a transversely extending flange that confronts and contacts an outer surface of at least one of the distal blade portions during cutting to guide and resist axial separation of the cutting edges away from the cutting plane, wherein
   the inner surface is substantially parallel to the outer surface prior to cutting.

2. The cutting tool of claim 1, wherein said guide member comprises a trough-like portion with spaced elongated sidewalls, and said at least one inner surface of said guide member comprises the inner surfaces of said sidewalls.

3. The cutting tool of claim 2, wherein said outer surfaces of said at least one distal blade portions comprise outer surfaces of both distal blade portions.

4. The cutting tool of claim 3, wherein said guide member extends over the distal ends of both distal blade portions during cutting.

5. The cutting tool of claim 1, wherein said guide member translates relative to the first blade.

6. The cutting tool of claim 5, wherein said guide member comprises a pin slidably carried in a transverse hole in said first distal blade portion, and said at least one inner surface of said guide member comprises portions of the surface of said pin.

7. The cutting tool of claim 6, wherein said outer surface of said at least one distal blade portions comprises inner surfaces of a transverse groove in said second distal blade portion and portions of the inner surface of said transverse hole in said first distal blade portion.

8. The cutting tool of claim 5, wherein said guide member comprises a retractable arm.

9. The cutting tool of claim 8, wherein said guide member is biased away from the second distal blade portion.

10. The cutting tool of claim 8, wherein said guide member is biased toward the second distal blade portion.

11. The cutting tool of claim 10, wherein said guide mechanism comprises a rail carried by the first distal blade portion, said rail supporting said guide member for sliding movement therealong.

12. The cutting tool of claim 1, wherein said guide mechanism retracts by force from a workpiece to receive the workpiece and the workpiece is placed in the space between the blades, which subsequently causes said guide member to automatically extend toward the second distal blade portion before cutting of the workpiece begins.

13. The cutting tool of claim 12, wherein said guide mechanism comprises an activation portion extending into the space between the blades, when open, for deflection by a workpiece entering said space, said deflection causing said guide member to move toward the second distal blade portion.

14. The cutting tool of claim 13, wherein said guide member is biased away from the second distal blade portion.

15. The cutting tool of claim 12, wherein said guide member is biased toward the second distal blade portion.

16. The cutting tool of claim 1, wherein said guide mechanism is responsive to relative pivotal blade movement to cause said guide member to move toward the second distal blade portion.

17. The cutting tool of claim 16, wherein said guide mechanism comprises an activation portion contacting the second blade and caused to move by relative blade movement.

18. The cutting tool of claim 17, wherein said guide member is biased away from the second distal blade portion.

19. The cutting tool of claim 1, wherein said guide member rotates relative to the first blade.

20. The cutting tool of claim 19, wherein said guide member is carried by an actuating lever pivoted to the first blade.

21. The cutting tool of claim 20, wherein said actuating lever is biased away from said second distal blade portion, and an activation portion of said actuating lever extends into the space between the blades, when open, for deflection by a workpiece entering said space, said deflection pivoting said actuating lever and moving said guide member into engagement with said first and second distal blade portions.

22. The cutting tool of claim 20, wherein said outer surface of said at least one distal blade portions comprises the outer surfaces of both distal blade portions, said guide member comprises a trough-like portion with spaced elongated sidewalls, and said at least one inner surface of said guide member comprises inner surfaces of said sidewalls, which confront said outer surfaces of said at least one distal blade portions when said guide member extends over the distal ends of both distal blade portions during cutting.

23. The cutting tool of claim 1, wherein said guide member is slidably connected to the first blade.

24. The cutting tool of claim 23, wherein said guide mechanism further comprises an actuating lever pivoted to the first blade and slidably and pivotally connected to the guide member.

25. The cutting tool of claim 24, wherein said actuating lever is biased away from said second distal blade portion, and an activation portion of said actuating lever extends into the space between the blades, when open, for deflection by a workpiece entering said space, said deflection pivoting said actuating lever and moving said guide member into engagement with said second distal blade portion.

26. The cutting tool of claim 24, wherein said actuating lever is pivoted intermediate its length to the first blade and slidably and pivotally connected near one of its ends to said guide member, said guide mechanism further comprising an activating link carried by the first blade and pivotally connected to said actuating lever near the other end thereof, said activating link contacting the second blade and caused to move by relative blade movement.

27. The cutting tool of claim 24, wherein said guide member comprises a pin slidably carried in a transverse hole in said first distal blade portion, and said at least one inner surface of said guide member comprises portions of the outer surface of said pin.

28. The cutting tool of claim 27, wherein said outer surface of said at least one distal blade portions comprises inner surfaces of a transverse groove in said second distal blade portion and portions of the inner surface of said transverse hole in said first distal blade portion.

29. The cutting tool of claim 24, wherein said outer surface of said at least one distal blade portions comprises outer surfaces of both distal blade portions, said guide member comprises a trough-like portion with spaced elongated sidewalls, and said at least one inner surface of said guide member comprises inner surfaces of said sidewalls, which confront said outer surfaces of said at least one distal blade portions when said guide member extends over the distal ends of both distal blade portions during cutting.

30. A method of cutting a workpiece, comprising:
placing a workpiece between first and second shearing blades mounted for relative pivotal movement about a pivot axis and having respective cutting edges defining therebetween a transverse cutting plane substantially normal to said pivot axis, wherein:
said first and second blades have respective first and second distal blade portions that converge transversely as the blades relatively advance from an open position to engage the workpiece, and
said first blade supports a guide member movable transversely relative to the first distal blade portion and toward and away from the second distal blade portion, said guide member having at least one inner surface of a transversely extending flange of said guide member that confronts and contacts an outer surface of at least one of the distal blade portions during cutting to guide and resist axial separation of the cutting edges away from the cutting plane;
moving said guide member transversely toward the second distal blade portion; and
moving the blades relative to one another to advance them toward and then through the workpiece, wherein
the inner surface is substantially parallel to the outer surface prior to cutting.

31. The method of claim 30, wherein the step of moving said guide member toward the second distal blade portion follows performing the step of placing the workpiece between the blades.

32. The method of claim 30, wherein the step of moving said guide member toward the second distal blade portion is effected by performing the step of moving the blades relative to one another to advance them toward the workpiece.

33. The method of claim 32, wherein the step of moving said guide member toward the second distal blade portion is effected at the beginning of performing the step of moving the blades relative to one another.

34. The method of claim 33, wherein the step of moving said guide member toward the second distal blade portion is substantially completed before cutting of the workpiece begins.

35. The method of claim 30, comprising a further step of moving said guide member away from the second distal blade portion so that said at least one inner surface of said guide member no longer confronts said outer surface of said at least one distal blade portions.

36. The method of claim 35, wherein said further step is effected by completing the step of advancing the blades through the workpiece.

37. The method of claim 35, wherein said further step comprises moving the blades relative to one another to separate the first and second distal blade portions and reopen the blades.

38. The method of claim 30, wherein the step of placing a workpiece between the blades comprises first moving said guide member away from the second distal blade portion, and the step of moving said guide member toward the second distal blade portion comprises returning said guide member to its initial position.

39. The method of claim 38, wherein the step of placing a workpiece between the blades comprises urging said guide member against the workpiece to deflect said guide member away from the second distal blade portion.

40. A cutting tool comprising:
first and second shearing blades mounted for relative pivotal movement about a pivot axis and having respective cutting edges defining therebetween a transverse cutting plane substantially normal to said pivot axis, said first and second blades having respective first and second distal blade portions defining a workpiece-admitting gap therebetween when the blades are open, and converging transversely as the blades relatively advance to engage a workpiece disposed between the blades; and
a guide mechanism comprising:
a guide member mounted to the first blade for transverse movement relative to the first distal blade portion and toward and away from the second distal blade portion, said guide member having an inner surface of a transversely extending flange that confronts and contacts an outer surface of the second distal blade portion during cutting to guide and resist axial separation of the cutting edges away from the cutting plane, and
a spring biasing said guide member toward the second distal blade portion so that said guide member spans at least a portion of said gap when the blades are open, wherein
the inner surface is substantially parallel to the outer surface prior to cutting.

41. A cutting tool according to claim 40, wherein said guide member spans at least half of said gap when the blades are open.

42. A cutting tool according to claim 40, wherein when the blades are open, said guide member extends farther from said pivot axis than the second distal blade portion.

43. A cutting tool according to claim 40, wherein said guide mechanism comprises a transversely extending rail fixed relative to the first blade and supporting said guide member for sliding movement therealong.

44. A cutting tool according to claim 43, wherein said guide mechanism comprises a bracket secured to the first distal blade portion and having two transversely spaced ears supporting said rail; said guide member comprises a boss captured by said rail and slidable therealong in the space between said ears; and said spring surrounds said rail between said boss and the ear farther from said gap.

45. A cutting tool according to claim 44, wherein said inner surface of said guide member comprises the transversely extending flange spaced from said boss that confronts the outer surface of the second distal blade portion during cutting.

* * * * *